United States Patent
Jacob et al.

(10) Patent No.: US 7,993,595 B2
(45) Date of Patent: Aug. 9, 2011

(54) APPARATUS FOR DEPOSITING FLUIDS IN A SOLIDS FLOW OF A SPOUTED BED APPARATUS

(75) Inventors: Michael Jacob, Weimar (DE); Karlheinz Rumpler, Weimar (DE); Mike Waskow, Weimar (DE)

(73) Assignee: Glatt Ingenieurtechnik GmbH, Weimar (DE)

( * ) Notice: Subject to any disclaimer, the term of this patent is extended or adjusted under 35 U.S.C. 154(b) by 249 days.

(21) Appl. No.: 12/193,553

(22) Filed: Aug. 18, 2008

(65) Prior Publication Data
US 2009/0087351 A1    Apr. 2, 2009

Related U.S. Application Data

(62) Division of application No. 10/744,222, filed on Dec. 22, 2003, now abandoned.

(30) Foreign Application Priority Data

May 15, 2003   (DE) .................................. 103 22 062

(51) Int. Cl.
*B01J 8/18*    (2006.01)

(52) U.S. Cl. ............ 422/143; 422/141; 34/582; 34/588; 34/589; 23/313 FB

(58) Field of Classification Search .................. 422/141, 422/143; 23/313 FB; 34/582, 583, 585, 34/588, 589
See application file for complete search history.

(56) References Cited

U.S. PATENT DOCUMENTS

| 3,451,784 | A |   | 6/1969  | Guerrieri |
|-----------|---|---|---------|-----------|
| 3,733,061 | A |   | 5/1973  | Bockman |
| 3,834,927 | A |   | 9/1974  | Putney |
| 3,880,116 | A |   | 4/1975  | Prillig et al. |
| 4,071,304 | A |   | 1/1978  | Chauvin et al. |
| 4,217,127 | A |   | 8/1980  | Kono et al. |
| 4,255,168 | A |   | 3/1981  | Nguyen |
| 4,354,450 | A |   | 10/1982 | Nagahama et al. |
| 4,848,673 | A |   | 7/1989  | Masuda et al. |
| 4,990,371 | A |   | 2/1991  | Dutta et al. |
| 5,211,985 | A | * | 5/1993  | Shirley et al. .................. 427/213 |
| 5,395,449 | A |   | 3/1995  | Quadir et al. |
| 6,740,632 | B1 | * | 5/2004 | Jacob et al. .................... 510/444 |
| 2004/0143939 | A1 | | 7/2004 | Bedetti |

FOREIGN PATENT DOCUMENTS

| DE | 3117892 | 3/1982 |
|----|---------|--------|
| DE | 3400397 | 11/1984 |

(Continued)

OTHER PUBLICATIONS

Jonathan Thomas Scott "Nitrification Rates in a Reversed-Flow, Spouted, Bed, Bioreactor Applied to Recirculating Aquaculture Systems" 1995, Louisiana State University.

*Primary Examiner* — Jennifer A Leung
(74) *Attorney, Agent, or Firm* — Volpe and Koenig, P.C.

(57) ABSTRACT

An apparatus for introducing fluids into a solids flow of a spouted bed apparatus is provided. The apparatus includes a spray nozzle which opens into a reaction space of the spouted bed apparatus. A lower region of the reaction space is provided with a rectangular cross section for the spouted bed apparatus and is limited in an axial direction by at least one inclined stream return flow wall and an oppositely inclined stream inlet wall with the formation of an axial gap through the reaction space for supplying inlet air. At least one nozzle is also provided for introducing fluid above the gap opens into the reaction space.

12 Claims, 4 Drawing Sheets

FOREIGN PATENT DOCUMENTS

| | | | |
|---|---|---|---|
| DE | 19904657 A1 * | 8/2000 | |
| DE | 10004939 | 8/2001 | |
| EP | 1125629 | 8/2001 | |
| EP | 1325775 | 7/2003 | |

* cited by examiner

APPARATUS FOR DEPOSITING FLUIDS IN A SOLIDS FLOW OF A SPOUTED BED APPARATUS

CROSS REFERENCE TO RELATED APPLICATION

This application is a division of U.S. patent application Ser. No. 10/744,222, filed Dec. 22, 2003, which is incorporated by reference as if fully set forth.

BACKGROUND

The invention relates to a process for depositing fluids in a solids flow of a spouted bed apparatus and an associated apparatus.

From DE 31 17 892 A1, a spouted bed apparatus for producing granulates is known, for which a fluid is introduced into the solids flow of the spouted bed granulator. The spouted bed apparatus has a round cross section, whose lower part is formed with a conical taper. A gas channel, where a nozzle for injecting the fluid is arranged, opens into the central conical part of the spouted bed granulator. An appropriate gas is fed through the gas channel for maintaining the spouted bed. The centrally fed gas entrains the fluid introduced by the nozzles and a portion of the material located in the spouted bed granulator, wherein a stream channel is produced in which the material particles are wetted with the fluid. The sprayed material is fed back to the stream channel over the conical base, so that particle circulation is generated. After achieving an adequate granulate size, the granulates are discharged from the spouted bed granulator.

A disadvantage for this type of spouted bed granulator is that the supply of gas for generating the spouted bed and the introduced fluid is supplied at a common location in the lower part of the spouted bed granulator. A uniform wetting of all material particles to be treated with fluid is hard or impossible to realize. Some material particles are sprayed with too much and others with too little fluid, so that an end product with equal grain size and equal material structure cannot be realized. In addition, these systems are only suitable for granulation at low material throughputs. For greater throughputs, problems appear in terms of generating and maintaining the spouted bed.

Previously known from the publication DE 100 04 939 C1 is a spouted bed apparatus for fluidization and thermal treatment of essentially arbitrarily shaped materials with different particle dimensions as well as particle masses. The spouted bed apparatus for batch or continuous process control consists of an inlet air chamber arranged in the lower region of the spouted bed apparatus, into which the fluidizing means, such as, especially air, is supplied. The fluidizing means is fed to the fluidization region of the spouted bed apparatus by means of a controllable gas flow device arranged between the inlet air chamber and the fluidization region. The fluidization region is formed by the gas flow device arranged in the lower region, as well as by a stream inlet wall, a stream return flow wall lying opposite the stream inlet wall, and also the side walls. The stream inlet wall and the stream return flow wall are inclined relative to the vertical, so that they form a cone. Therefore, an expanded cross section of the spouted bed apparatus is formed above the stream inlet wall and the stream return flow wall. This expanded section is used as an expansion region for the fluidizing means and is provided with an outlet for the exhaust air. The spouted bed apparatus can be one-sided or two-sided, i.e., it can be formed with a double cone. Through the arrangement of the stream inlet wall and the stream return flow wall as well as through the supply of fluidizing means through the gas flow device, a type of solids rotation is produced in the fluidization region, in which a corresponding material treatment is performed.

An introduction of fluids into the solids flow is not provided with this type of stream apparatus.

SUMMARY

The object of the invention is to create for a spouted bed apparatus a process and an associated apparatus with which a fluid can be selectively and adjustably deposited on the material in the spouted bed for producing coated granulates, for wetting material particles, and for granulation and agglomeration of different materials for a wide range of industrial branches, so that an end product is produced with approximately equal grain size and equal material properties even for large material throughputs.

This object is achieved by the process and apparatus according to the invention.

Through the formation of at least one circular solids flow in the axial direction of the reaction space of the spouted bed apparatus, for which the inlet air required for forming the solids flow is fed over a gap in the lower region and in the axial direction of the reaction space and the fluid is introduced by means of one or more single and/or multiple-component nozzles at one or more positions in the solids flow, the flow conditions in the injection region can be set so that the fluid can be introduced selectively and adjustably into the solids flow. The resulting end product distinguishes itself through approximately equal grain size with equal material properties. By spraying pure fluids, solutions, molten masses, or the like through one or more single and/or multiple-component nozzles into the solids flow, different end products can be produced.

Another advantage of the solution according to the invention is that with the proposed process and apparatus, the material to be treated can be exposed to various technologies, such as granulation, agglomeration, wetting, and coating.

Additional advantageous configurations are described in the dependent claims. They are explained in the description together with their effect.

BRIEF DESCRIPTION OF THE DRAWINGS

The invention is explained in more detail in the following with reference to an embodiment. Shown in the associated drawings are.

DETAILED DESCRIPTION OF THE PREFERRED EMBODIMENTS

Figure 1:
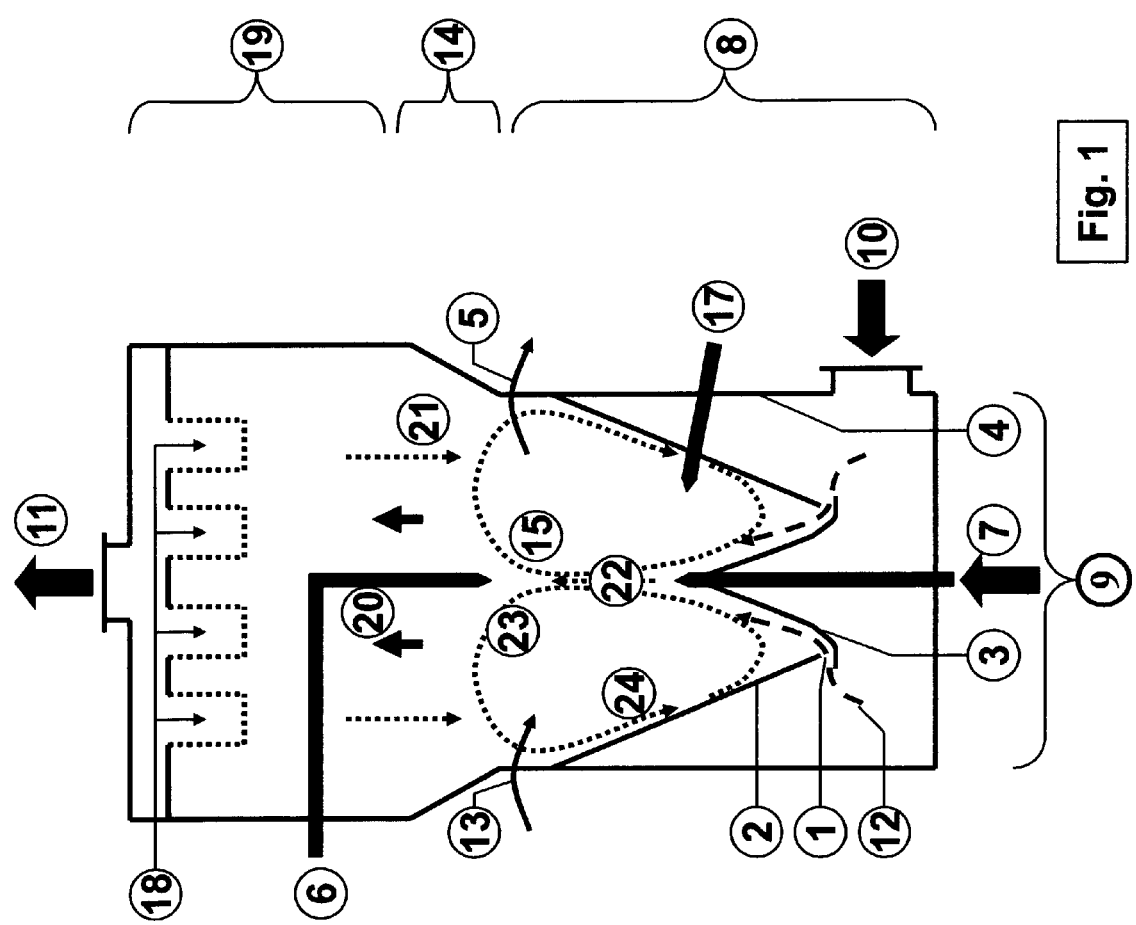
FIG. 1 is a sectional view of a spouted bed apparatus according to the invention.
Figure 2:
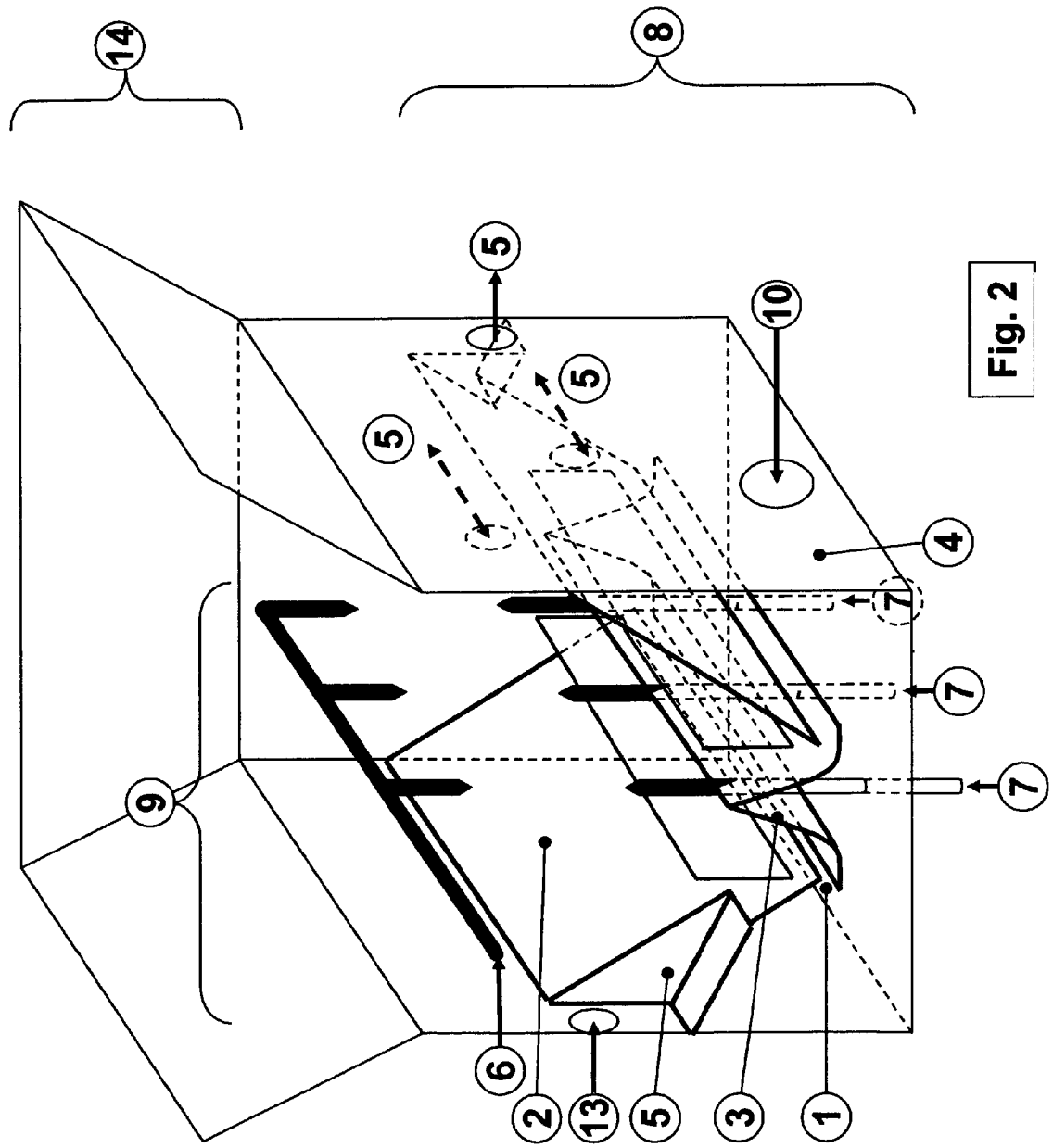
FIG. 2 is a perspective view of a variant of the spouted bed apparatus according to the invention.

In FIG. 1, a spouted bed apparatus is shown, whose apparatus cross section 9 features a rectangular cross section. In FIG. 2, a section of the spouted bed apparatus shown in FIG. 1 is illustrated in perspective. The fundamental construction of the spouted bed apparatus includes an inlet air chamber 8, an expanding cross-section expansion region 14 arranged above this chamber, and a dedusting system 19. In the housing 4 of the flow apparatus, there is a supply port for the inlet air 10 in the lower part of the inlet air chamber 8, while in the upper region of the spouted bed apparatus there is an outlet for the exhaust air 11. The dedusting system 19 is provided with a known filter cleaning device 18, which feeds the separated dust into the reaction space 26 of the spouted bed apparatus.

In the region of the inlet air chamber 8, the housing 4 of the spouted bed apparatus, as viewed in the axial direction, has at least one stream return flow wall 2 and one stream inlet wall 3, which define the actual reaction space 26 of the spouted bed apparatus. FIG. 1 shows a preferred variant of the formation of reaction space 26, for which the lower region of the reaction space 26 is limited in the axial direction by two inclined stream return flow walls 2, which are each associated with an inclined stream inlet wall 3 under the formation of two axial gaps 1. These return flow walls are connected together in the top region. However, the lower region of the reaction space 26 can also be formed by only one inclined stream return flow wall 2 and an opposing inclined stream inlet wall 3 under the formation of an axial gap 1 running through the reaction space 26 for supplying inlet air 10. Controllable valve devices for setting the amount and the rate of the air flow 12 fed to the reaction space 26 are arranged in the gap 1. The gap 1 is formed such that the air flow 12 of the inlet air 10 is fed against the lower region of the stream inlet wall 3.

The material to be treated is fed into the reaction space 26 through a material inlet 13, wherein under the effect of the supplied air flow 12, a circular solids flow 15 is formed in the axial direction of the reaction space 26. The material inlet 15 preferably opens in the region of a flow 24 of the downwards solids flow 15 into the reaction space 26. The material leaves the reaction space 26 through a solids outlet 5, wherein the solids outlet 5 is arranged in the region of the transition of the cross flow 23 to the solids flow 24 of the downwards solids flow 15.

For introducing fluid into the solids flow 15, at various positions above the gap 1 one or more nozzles 6, 7, 17 open into the reaction space 26. Here, the nozzles 7 act in the direction of the upwards flow 22, the nozzles 6 act against the direction of the upwards flow 22, and the nozzles 17 are arranged in the region of the downwards flow 24. Several nozzles 6 and/or 7 and/or 17 arranged one next to the other in the axial direction of the reaction space 26 open into the reaction space 26 of the spouted bed apparatus.

As can be seen from FIG. 2, an axial separating plate 16, whose lower edge is at a distance to the stream return flow wall 2, is arranged in the lower region of the reaction space 26 between the stream return flow wall 2 and the housing wall 3.

Figure 3:
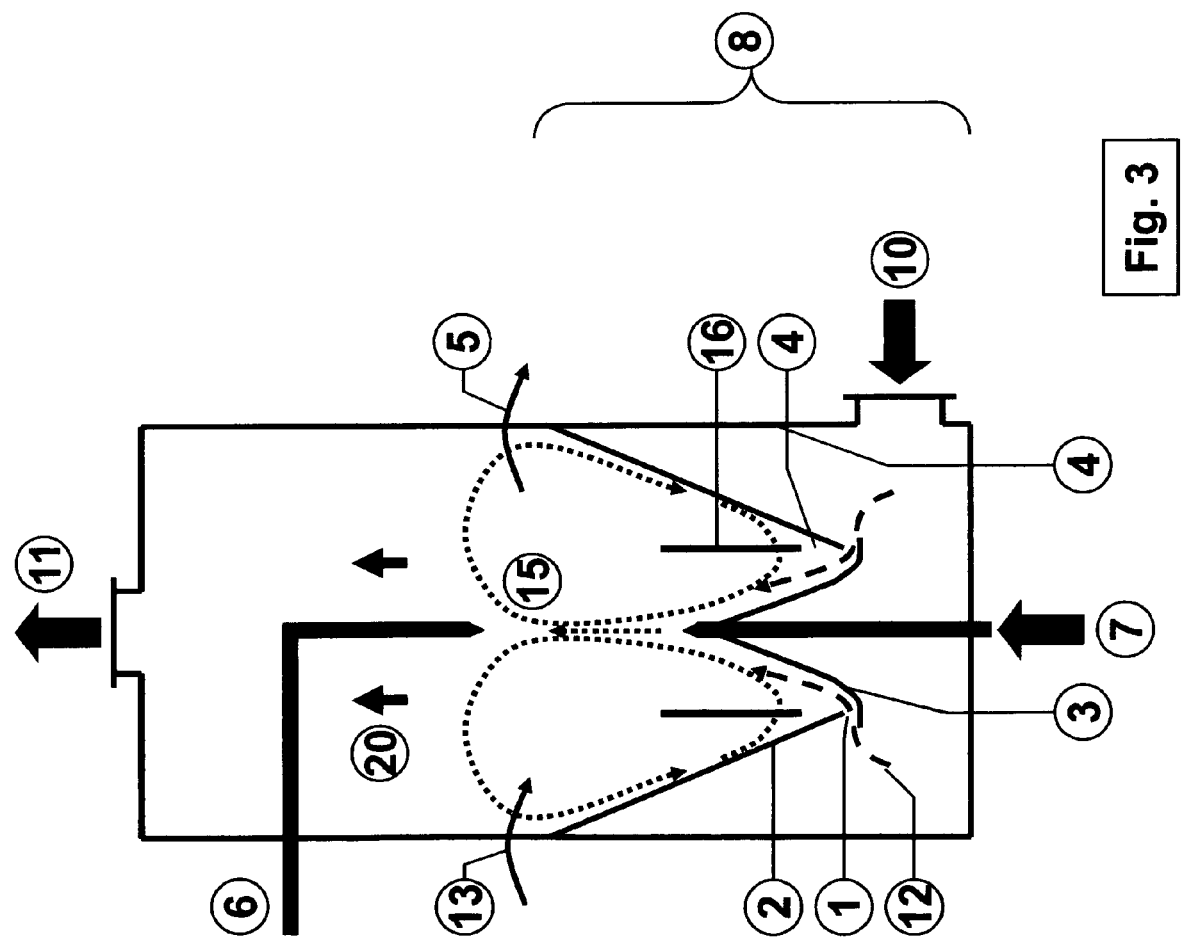
FIG. 3 is a sectional view of another variant of the spouted bed apparatus according to the invention.

In FIG. 3, a spouted bed apparatus is shown without an integrated dedusting system 19. Here, the dust-bearing exhaust air 20 is discharged as exhaust air 11 from the spouted bed apparatus and is dedusted in a downstream, separate dedusting system that is not shown.

Figure 4:
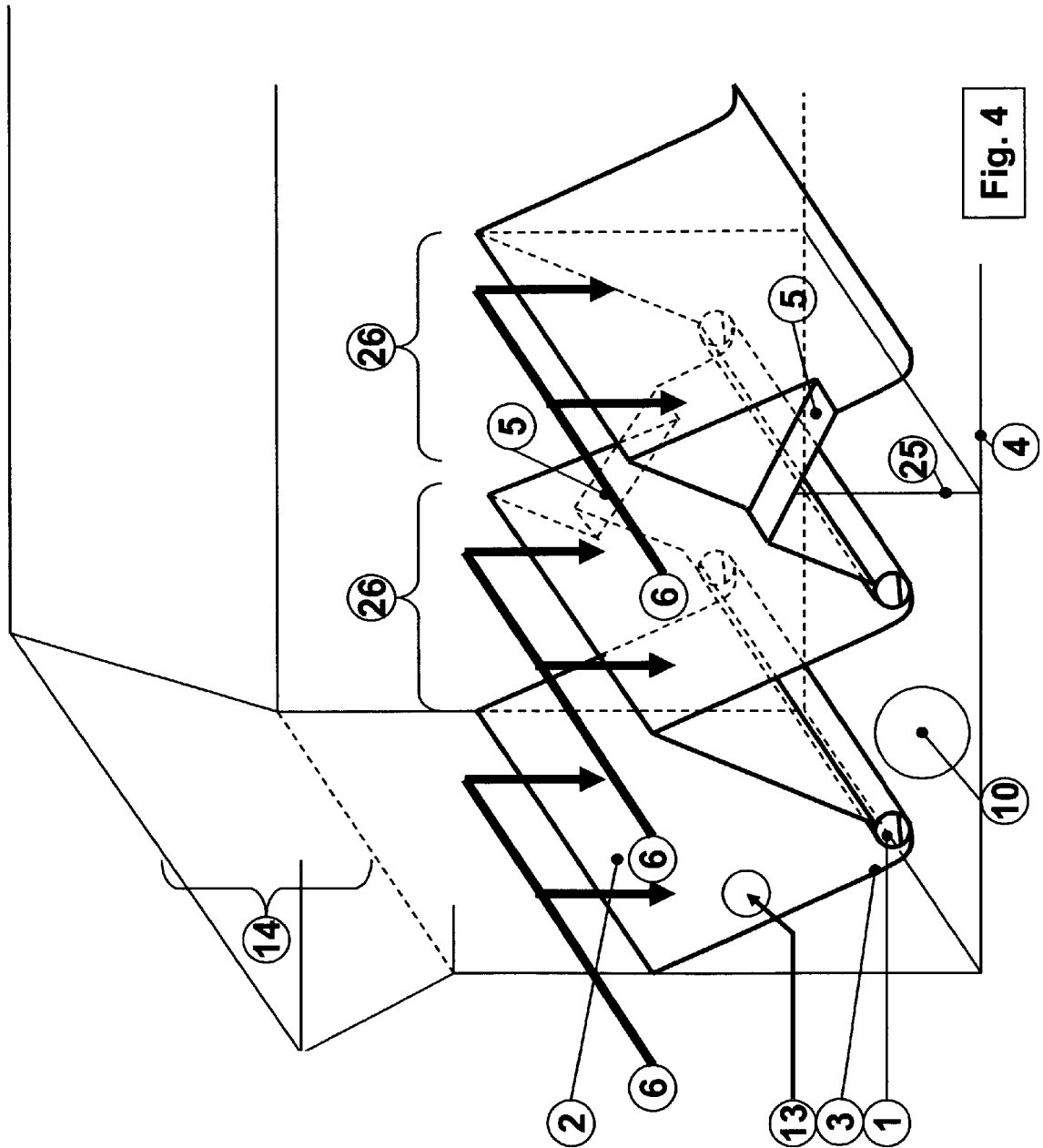
FIG. 4 is a perspective view of several reaction spaces arranged one next to the other for the spouted bed apparatus according to the invention.

In FIG. 4, a multi-stage spouted bed apparatus is shown, which is formed from several reaction spaces 26 arranged one next to the other. Here, two adjacent reaction spaces 26 are connected to each other over a common overflow port, which is formed for the first reaction space as a solids discharge 5 and for the second reaction space as a solids inlet 13. Here, the lower region of the inlet air chamber 8 can be divided into several segments through the arrangement of separating walls 25, which enclose one or more reaction spaces 26. Inlet air 10 can be supplied in different amounts, temperatures, and flow rates into the spaces produced here for the reaction spaces 26.

The effect of the spouted bed apparatus is explained in more detail with reference to the following process according to the invention.

The process according to the invention for introducing fluid into a solids flow of a spouted bed apparatus for producing coated granulates, for wetting material particles, and for the granulation and agglomeration of different materials for a wide range of industrial branches, generates at least one circular solids flow 15 in the axial direction of the reaction space 26, in which a fluid is injected. Here, the solids flow 15 is formed with an upwards flow 22 with a high flow rate, with a cross flow 23 with a lower flow rate, and with a downwards flow 24, which has a lower flow rate than the cross flow 23, by supplying inlet air 10 through a gap 1 in the lower region and in the axial direction of the reaction space and by the injected fluid. The downwards solids flow 24 in the reaction space 26 is generated by the effect of gravity.

The material to be treated is transported by the circular solids flow 15 through the elongated reaction space 26 from the material inlet 13 to the solids outlet 5, wherein the material is sprayed with fluid by means of the nozzles 6 and/or 7 and/or 17 arranged one behind the other in the axial direction of the reaction space 26. Here, the fluid is introduced by means of single and/or multiple-component nozzles 6, 7, 17 at one or more positions in the solids flow 15. Corresponding to the end product to be produced, a pure fluid, solution, molten mass, or the like is sprayed into the solids flow 15. Through correspondingly set flow ratios in the reaction space 26 and through the supply of fluids into the solids flow 15, a wetting, coating, or a granulation or agglomeration of the material is performed corresponding to the end product to be produced.

For forming the solids flow 15 with a desired flow profile, the amount and the flow rate of the inlet air 10 supplied to the reaction space 26 and/or the air flow 12 can be set controllably, wherein in an advantageous way, two opposing circular solids flows 15 are generated in the reaction space 26. The formation of the solids flow 15 is supported by the injection of fluid and by the arranged separating plates 16. Through the resulting gap between the separating plate 16 and the stream return flow wall 2, the material of the downwards directed flow 24 is output directly to the air flow 12 supplied from the gap 1, which also simultaneously creates a stabilization of the upwards flow 22. In addition, the separating plate 16 prevents an undesired overflow of the material between the downwards flow 24 and the upwards flow 22, especially for a high material load in the solids flow 15.

The material supply into the reaction space 26 is performed by the material inlet 13 in the region of the downwards solids flow 24, while the material discharge of the final product is performed from the reaction space 26 or a material transport into another downstream reaction space 26 in the region of the transition of the cross flow 23 to the downwards solids flow 24.

For protecting the environment or subsequent equipment from contamination due to the material to be treated, the dedusting system 19 is an integrated component of the spouted bed apparatus. The dedusting of the dust-loaded discharge air 20 is performed, e.g., in a tube or cartridge filter, while the separated dust 21 of the solids flow 15 is fed back and thus takes part in the further treatment process.

In conclusion the following can be stated:

The invention relates to a process for introducing fluids into a solids flow of a spouted bed apparatus with the features mentioned in the preamble of Claim 1 and an associated apparatus with the features mentioned in the preamble of Claim 11.

The object of the invention is to create, for a spouted bed apparatus, a process and an associated apparatus, with which a fluid is deposited selectively and adjustably onto the material in the spouted bed for producing coated granulates, for wetting material particles, and for granulation and agglomeration of different materials for a wide range of industrial branches, in order to produce an end product with approximately equal grain size and equal material properties even for large material throughputs.

According to the invention, this is achieved by the formation of at least one circular solids flow in the axial direction of the reaction space of the spouted bed apparatus, for which the inlet air required for forming the solids flow is supplied through a gap in the lower region and in the axial direction of the reaction space and the fluid is introduced by means of one or more single and/or multiple-component nozzles at one or more positions in the solids flow. Therefore, the flow conditions can be set in the injection region, so that the fluid can be introduced selectively and adjustably into the solids flow. The resulting end product distinguishes itself through approximately equal grain size with equal material properties. By spraying pure fluids, solutions, molten masses, or the like through one or more single and/or multiple-component nozzles into the solids flow, different end products can be produced.

LIST OF REFERENCE NUMERALS

1 Gap
2 Stream return flow wall
3 Stream inlet wall
4 Housing
5 Solids outlet
6 Nozzle
7 Nozzle
8 Inlet air chamber
9 Apparatus cross section
10 Inlet air
11 Exhaust air
12 Air flow
13 Material inlet
14 Expansion region
15 Solids flow
16 Separating plate
17 Nozzle
18 Filter cleaning system
19 Dedusting system
20 Dust-bearing exhaust air
21 Separated dust
22 Upwards flow
23 Cross flow
24 Downwards flow
25 Separating walls
26 Reaction space

What is claimed is:

1. Apparatus for introducing fluids into a solids flow of a spouted bed apparatus, comprising a a reaction space of the spouted bed apparatus, wherein a lower region of the reaction space is provided with a rectangular cross section for the spouted bed apparatus and is limited in an axial direction by at least one inclined stream return flow wall and an oppositely inclined stream inlet wall defining an axial gap through the reaction space for supplying inlet air; and a plurality of nozzles, for introducing fluid above the gap, which open into the reaction space, at least one of the nozzles is arranged in an upward flow direction, and at least one of the nozzles is arranged in a downward flow area.

2. Apparatus according to claim 1, wherein the lower region of the reaction space is limited in the axial direction by two inclined stream return flow walls, which are each associated with an inclined stream inlet wall with the formation of two axial gaps, wherein the stream inlet walls are connected together in an upper region.

3. Apparatus according to claim 1, wherein controllable valve devices for setting an amount and rate of the air flow supplied to the reaction space are arranged in the gap.

4. Apparatus according to claim 1, wherein the gap is formed such that the air flow of the inlet air is guided against the lower region of the stream inlet wall.

5. Apparatus according to claim 1, wherein the spouted bed apparatus is formed from one or more adjacent reaction spaces.

6. Apparatus according to claim 5, wherein two adjacent reaction spaces are connected to each other over a common overflow port, which is formed for the first reaction space as a solids outlet and for the second reaction space as a solids inlet.

7. Apparatus according to claim 1, further comprising an axial separating plate, whose lower edge is arranged at a distance to the stream return flow wall in the lower region of the reaction space between the stream return flow wall and the stream inlet wall.

8. Apparatus according to claim 1, wherein the upper region of the reaction space is formed as a separating space.

9. Apparatus according to claim 1, wherein a material inlet opens into the reaction space in the region of a downwards solids flow.

10. Apparatus according to claim 1, wherein a solids outlet is arranged on one of the housing walls in a region of transition of a cross flow to a downwards solids flow.

11. Apparatus according to claim 1, wherein in the axial direction several adjacent nozzles open into the reaction space of the spouted bed apparatus.

12. Apparatus according to claim 11, wherein some of the nozzles act in the direction of an upwards flow, some of the nozzles act against the direction of an upwards flow, and some of the nozzles are arranged in the region of the downwards flow.

* * * * *